United States Patent
Mitchell

(10) Patent No.: US 7,813,742 B1
(45) Date of Patent: *Oct. 12, 2010

(54) POSITION-BASED CHANNEL CODING SYSTEM AND METHOD

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1026 days.

This patent is subject to a terminal disclaimer.

(21) Appl. No.: 11/527,234

(22) Filed: Sep. 26, 2006

(51) Int. Cl.
*H04W 24/00* (2009.01)
(52) U.S. Cl. .................. 455/456.1; 455/456.3
(58) Field of Classification Search ............ 455/456.1, 455/414.2, 414.1, 404.2, 77, 456.3, 450, 455/464, 441, 457

See application file for complete search history.

(56) References Cited

U.S. PATENT DOCUMENTS 7,221,928 B2 * 5/2007 Laird et al. ............. 455/404.1
7,519,376 B2 * 4/2009 Chang ..................... 455/456.3

* cited by examiner

*Primary Examiner*—Eugene Yun
(74) *Attorney, Agent, or Firm*—Matthew J. Evans; Daniel M. Barbieri

(57) ABSTRACT

The present invention is a position-based channel coding system for communications devices. The device may comprise one or more of the following features: (a) a global positioning system (GPS) receiver capable of receiving positioning data from GPS satellites; (b) a radio frequency (RF) transceiver having at least a first channel and a second channel; (c) a geographical information system (GIS) database of topographical data; (d) a processor capable of optimizing transceiving parameters of the RF transceiver based on the positioning data and topographical data; and (e) a bus linking the GPS receiver, RF transceiver, GIS database, and processor.

12 Claims, 5 Drawing Sheets

POSITION-BASED CHANNEL CODING SYSTEM AND METHOD

CROSS-REFERENCE TO RELATED APPLICATIONS

The present application is related to commonly assigned co-pending U.S. patent application Ser. No. 11/527,233 disclosing a Position Based Interleave Regulation System and Method, filed Sep. 26, 2006.

The present application is also related to commonly assigned co-pending U.S. patent application Ser. No. 11/527,156 disclosing a Position Based Modulation System and Method, filed Sep. 26, 2006.

FIELD OF THE INVENTION

This invention relates generally to mobile communications and, more specifically, to the optimization of transceiving parameters for mobile communication devices.

BACKGROUND OF THE INVENTION

A multitude of today's mobile communications systems rely upon interleaving, channel coding and adaptive modulation to ensure data is transmitted more reliably. When data is transmitted over a channel in the presence of noise, errors will inevitably occur. Such errors may create several consecutive anomalous bits in a given bit string. Burst errors may occur when signal transmission power drops below a threshold level or may be induced by either thermal noise from receiver input circuits or by radiated electromagnetic noise picked up by a receiver's antenna.

Data may be transmitted with control bits that enable a channel decoder to correct a maximum number of anomalous bits per given bit string length. If a burst error occurs, and more than this maximum number of bits are altered, the bit string cannot be correctly decoded. For this reason, the bits of a number of independent bit strings may be interleaved. Interleaving is a process of rearranging the ordering of a sequence of binary symbols in a deterministic manner. In communications technology, data from multiple channels may be interleaved so as to minimize the chance that large portions of data from any one channel are lost or degraded due to burst errors. For example, a binary value of a given length, such as a byte, from each of N channels is encoded into an N-byte bit string for transmission across a radio frequency (RF) channel. Following reception, the N-byte bit string is decoded back into the individual data streams of the N channels. As such, a burst error during the RF transmission will only affect a correctable number of bits for the bit string of any given channel, so the decoder can decode the bit string correctly. Examples of the various types of interleaving include, diagonal interleaving, block Interleaving, inter-block interleaving, and convolution interleaving.

Additionally, if all possible outputs of a channel correspond uniquely to a source input, there is no possibility of detecting errors in the transmission. The goal of a given channel encoding method is to represent source information in a manner that minimizes the probability of error in decoding. To accomplish this goal, channel coding incorporates the use of redundancy. To detect and possibly correct errors, a channel codeword sequence must be longer than the source sequence it represents. A good channel code is designed so that if errors occur in transmission, the output can still be identified with the correct input. This is possible because although incorrect, the output is sufficiently similar to the input to be recognizable. Examples of the various types of channel coding common in the art include, Turbo coding, Viterbi coding, Reed-Solomon coding, Trellis coding, parity codes and block coding.

Radio transmission of information traditionally involves employing electromagnetic waves or radio waves as a carrier. Where the carrier is transmitted as a sequence of fully duplicated wave cycles or wavelets, no information is considered to be transmissible. To convey information, a sequence of changes that can be detected at a receiving point are superimposed on the carrier signal. The changes imposed correspond with the information to be transmitted, and are known in the art as "modulation". Modulation modes common to the art include frequency modulation (FM), amplitude modulation (AM), quadrature amplitude modulation (QAM), phase-shift keying (PSK), and amplitude-shift keying (ASK).

It is also fully comprehended that as technologies and protocols emerge and evolve for wireless data transmissions, additional interleave, channel coding and modulation schemes may become available.

In cases where a channel is considered stable, a communication system may use permanently assigned interleave, channel coding, and modulation configurations selected from a performance chart maintained in the memory of individual system devices. However, where a channel has significant quality fluctuations, an adaptable interleave and/or channel coding and/or modulation mechanism could be used to select the optimal settings for transceiving a data stream.

For example, signal degradation issues may arise when mobile communications systems (e.g., asymmetric multicasting, broadcasting, etc.) lack the ability to update their interleave, channel coding and modulation configuration. A mobile channel may experience varying types and degrees of signal interference based on its position in relation to the geographic features of its locale. Having the use of only one interleave length or type, channel coding or modulation mode for a mobile radio in rough terrain could result in loss of data or poor channel optimization. Adaptable interleave, channel coding and modulation mechanisms permits the optimization of signal transmissions as a mobile wireless unit traverses through widely varying topographical conditions. Currently, standard methods of error detection and correction in mobile communications systems fail to account for influential factors such as the topographical conditions of the mobile environment. These factors can lead to significant channel control overhead traffic inefficiency and poor data service.

Current mobile communications systems often employ an "acknowledged/not acknowledged" (ACK/NAK) protocol where a receiver detects transmission errors in a message and automatically requests a retransmission from the transmitter. Usually, when the transmitter receives the request, the transmitter retransmits the message until it is either correctly received or the error persists beyond a predetermined number of retransmissions. A separate return channel is often used to transmit the request signal from the receiver back to the transmitter. However, dedicating channel resources and device power to such a trial-and-error based methodology is inefficient and expensive.

Therefore, there is a need to optimize transmission parameters for mobile communication devices in real-time based on terrain and line-of-sight information to overcome the effects of signal blockages and reflections from the surrounding topographical features while minimizing the channel resources required for coordinating such optimizations between multiple devices.

As such, it would be desirable to provide a system and a method for varying the interleave, channel coding and modulation parameters of a system of communications devices based on their relative positions as well as the topographical nature of those positions.

SUMMARY OF THE INVENTION

Accordingly, the present invention is directed to a position-based interleave regulation system and method.

In an embodiment of the invention, the system may comprise one or more of the following features: (a) a global positioning system (GPS) receiver capable of receiving positioning data from GPS satellites; (b) a radio frequency (RF) transceiver having at least a first channel and a second channel; (c) a geographical information system (GIS) database of topographical data; (d) a processor capable of optimizing transceiving parameters of the RF transceiver based on the positioning data and topographical data; and (e) a bus linking the GPS receiver, RF transceiver, GIS database, and processor.

In a further embodiment of the invention, a method for communicating between a two or more of mobile communications devices may comprise: (a) transmitting global positioning system (GPS) position data of a first communications device; (b) receiving GPS position data of a second communications device; (c) accessing a geographic information system (GIS) database comprising topographical data; (d) optimizing transceiving parameters for communicating data based upon the topographical data, the GPS position data of the first communications device, and the received GPS position data of the second communications device; and (e) transmitting the communications data.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Figure 1:
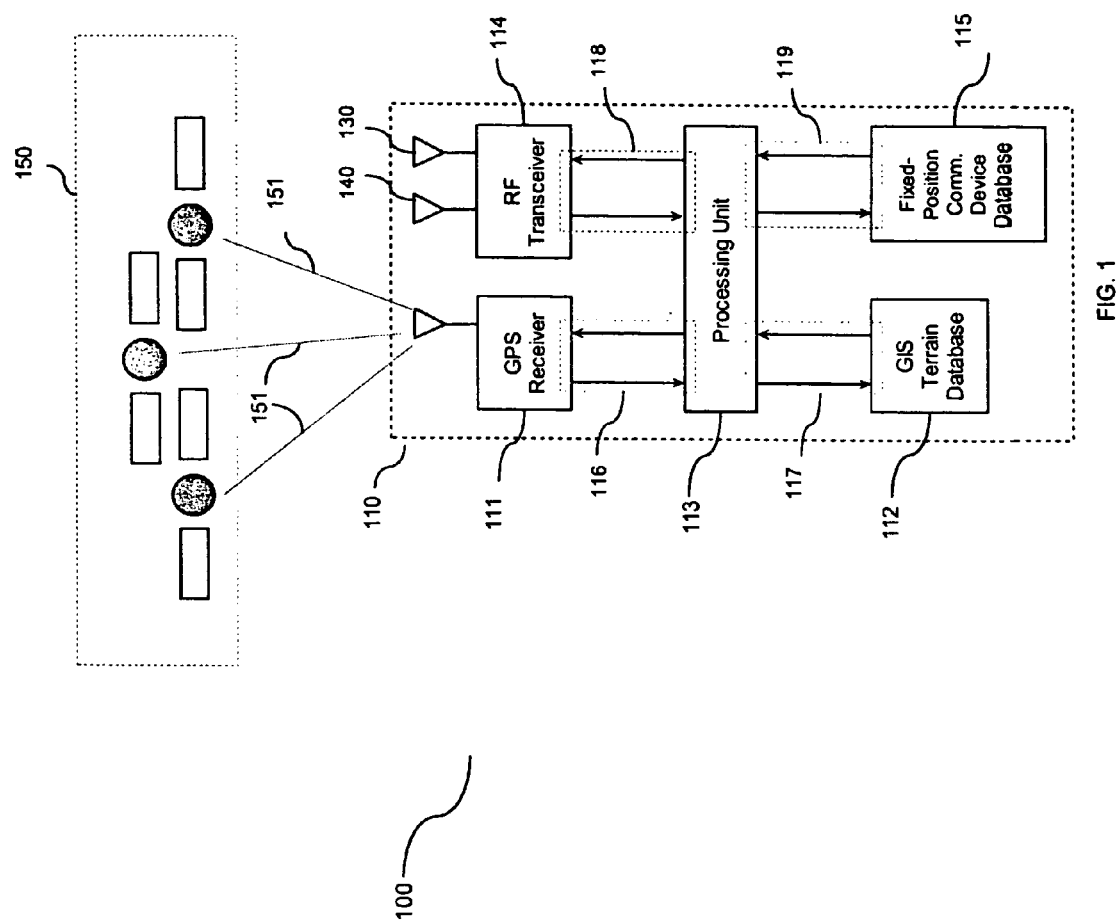
FIG. 1 depicts a mobile communications device in an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Reference will now be made, in detail, to presently preferred embodiments of the invention.

In mobile communications design, certain requirements must be balanced with respect to overall device performance. Devices may have numerous channels available for communication but the overall power available to the system must be allocated across these channels in such a manner that the highest priority signals receive the greatest amounts of power. The highest priority is regularly given to the forward channels transmitting the actual communications data while lower priority may be given to return channels transmitting device status or error correction information.

As such, efficient use of such low-power return channels is necessary. The present invention achieves such an efficient use by forgoing the ACK/NAK protocols currently found in the art in favor of using the low-power return channels to coordinate the management of transmission parameters for the high-powered forward channels. Such a mechanism would permit adaptation by the forward channels to account for degraded channel conditions, as opposed to ACK/NAK protocols where a system merely waits for those conditions to improve enough to resend data.

Additionally, as memory systems become smaller and their power requirements diminish, it has become considerably easier to maintain large amounts of data in mobile communications devices. As terrain databases such as those maintained by the United States Geological Survey continue to achieve increased levels of resolution, the combination of these high-fidelity terrain databases and increased device memory may result in enhanced communications capabilities.

The mobile communications device of the present invention incorporates information regarding an individual device's location and the physical nature of that location to define the optimal transmission and reception parameters for the system. It is fully contemplated that implementations of the subject invention including cellular and push-to-talk mobile telephones, land mobile radios, walkie-talkie radios, vehicular communications networks (such as ONSTAR™), and Joint Tactical Radio Systems could be implemented without departing from the spirit of the invention.

Additional details of the invention are provided in the examples illustrated in the accompanying drawings.

Referring to FIG. 1, a mobile communications device 100 in accordance with an embodiment of the present invention is disclosed. Each mobile communications device 110 possesses a GPS receiver 111 for receiving signals 151 from GPS satellites 150 enabling the device 110 to determine its three-dimensional geographic position. This position is output to a processing unit 113 via a data bus 116. The processing unit may be common in the art and may include those manufactured by Intel™, Texas Instruments™ or other processor manufacturer. Additionally, each device includes an embedded GIS database 112 containing high-fidelity information regarding topographical features such as terrain elevation, terrain composition (e.g., rock, soil, water, etc.), manmade structures, vegetation, and other geographical characteristics. Such databases are common in the art and may include those maintained by the United States Geological Survey. The data of the GIS database is accessible by the processing unit 113 via a data bus 117.

Figure 2:
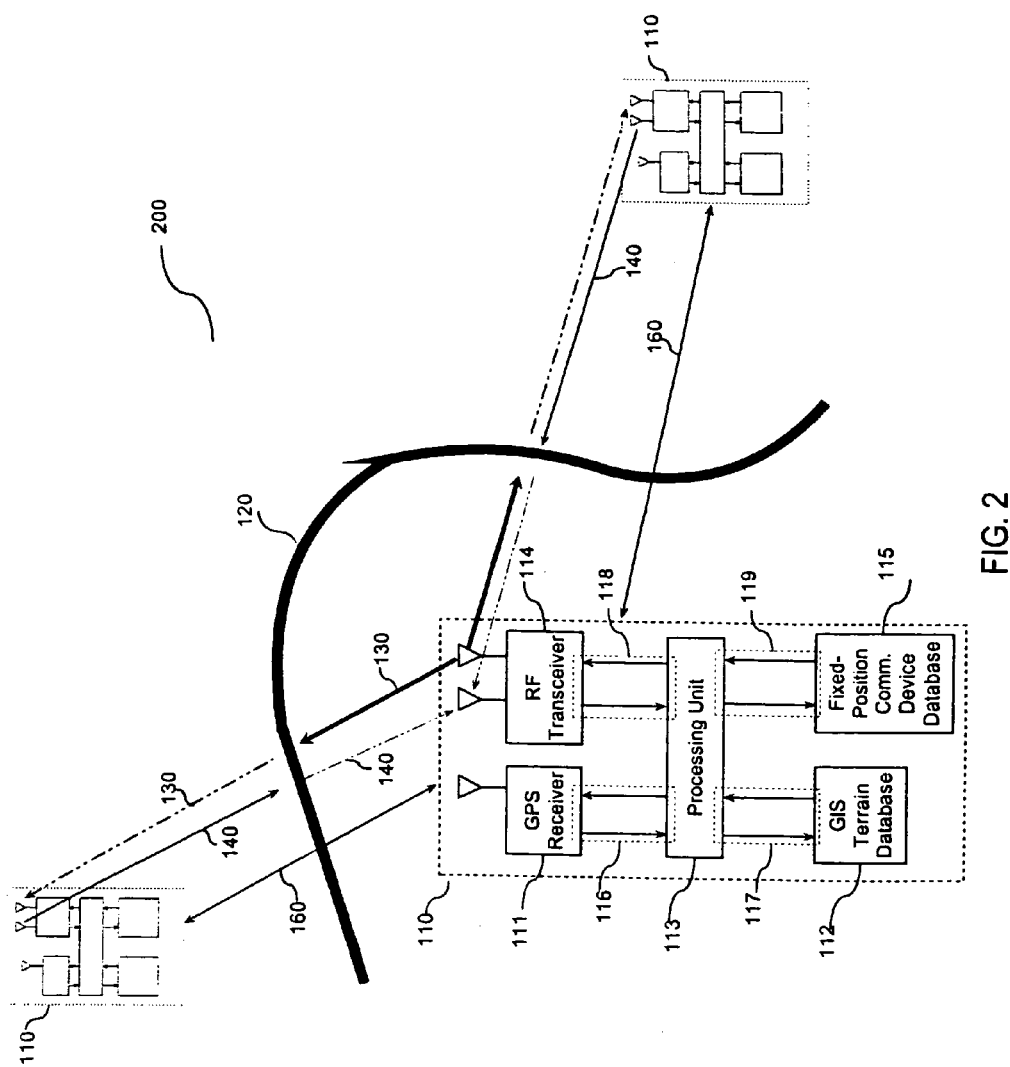
FIG. 2 depicts a plurality of mobile communications devices communicating via a high-power forward channel and a lower-power return channel in an embodiment of the present invention.

Referring to FIG. 2, a communications system 200 in accordance with an embodiment of the present invention is disclosed. The system 200 comprises two or more mobile communication devices 110. The system may further comprise one or more fixed-position communication devices (not shown).

The mobile communications devices 110 are capable of communicating between each other using an embedded RF transceiver 114 having a high-power forward channel 130 and a low-power return channel 140. The high-power forward channel 130 is used to convey the signal comprising the data which is to be communicated between the devices. The low-power return channel 140 is used to convey information regarding interleave and/or channel coding and/or modulation parameters and device location. The high-power forward channel 130 may incorporate interleaving and channel coding as a method of forward error correction. The interleave length and/or interleave type and/or channel coding and/or or modulation mode may be reconfigured by a processing unit 113.

Once a mobile communications device has determined its location utilizing the GPS receiver 111, it is able to transmit this position to other mobile communications devices 110 via the low-power return channel 140. This position data from the low-power return channel 140 is routed to the processing unit 113 in a mobile communications device 110 via a data bus 118. The processing unit 113 calculates the respective three-dimensional lines-of-sight (LoS) 160 between itself and the other devices.

The processing unit 113 can retrieve data concerning the terrain of each mobile communications device location from the GIS database 112 via a data bus 117. The processing unit 113 can utilize the LoS 160 and GIS data 112 to calculate a link-loss value representing the estimated signal degradation for the high-power forward channel 130 which will occur along a given LoS 160 due to topographical features 120 such as a hill or mountain (creating line of sight impediments) and their inherent characteristics (e.g., terrain blockage, scatter, diffraction, etc.).

The link-loss of the high-power forward channel 130 may be computed using a number of numerical models representing signal degradation due to topographical features 120. In one embodiment, the model is represented as:

$$\text{Link-loss} = 36.56 + 20\log_{10}(f) + 20\log_{10}(d_{LoS}) - \text{terrain loss factor} \quad (1)$$

where f is the transmission frequency, $d_{LoS}$ is the three-dimensional line-of-sight distance between two communications devices. Link-loss is measured in decibels (dB).

The terrain loss factor of Equation (1) may be calculated based on one of the several mathematical models common to the art. Such models may include the Bullington, Epstein/Peterson, or Deygout models for computing diffraction due to a terrain obstacle.

Each of these models extends the "single knife-edge" theory of diffraction to account for multiple terrain obstructions. The single knife-edge theory states that when a direct line-of-sight is obstructed by a single knife-edge type of obstacle, with height $h_m$, a diffraction parameter v is represented by:

$$v = h_m\left(\sqrt{\frac{2}{\lambda}\left(\frac{1}{d_T} + \frac{1}{d_R}\right)}\right)$$

where $d_T$ and $d_R$ are the distances from the knife edge to the transmitter and receiver respectively. The diffraction loss expressed in dB may be approximated by:

$$A_d = \begin{cases} 0 & v < 0 \\ 6 + 9v + 1.27v^2 & 0 < v < 2.4 \\ 13 + \log v & v > 2.4 \end{cases}$$

The Bullington method accounts for multiple terrain obstacles by defining a new 'effective' obstacle at the point where the lines-of-sight from the two antennas intersect. The Epstein/Peterson model suggests drawing lines-of-sight between relevant obstacles, and adding the diffraction losses at each obstacle. The Deygout model searches out the 'main' obstacle, (i.e., the point with the highest diffraction parameter, v, along the line-of-sight) and calculates the diffraction loss. Diffraction losses over 'secondary' obstacles are added to the diffraction loss over the main obstacle.

Once the terrain loss term is defined, each device can then compute the overall level of link-loss based on a line-of-sight model, Hata model, Fresnel model or other signal propagation model to independently optimize its settings with little or no low-power return channel 140 usage.

Additionally, the link-loss calculation may be augmented with actual channel measurement methods to obtain an enhanced view of current channel conditions. Each communications device may adjust its parameters in an attempt to meet a required worst case bit-error-rate (BER) for a given data application. For example an allowable BER for a video application may be $1 \times 10^{-9}$ bit errors per second. An observed BER of $1 \times 10^{-4}$ bit errors per second would indicate an inferior link for video and an adjustment to improve the link-loss must be made. However channel measurements are not always practical.

Following link-loss estimation, the processing unit 113 may map a given link-loss to an optimal interleave length and type, channel coding, or modulation mode for the high-power forward channel 130 and reconfigure the interleave and/or channel coding and/or modulation parameters of the RF transceiver 114 via a data bus 118. If the link-loss due to the surrounding terrain 130 is high, the interleave and/or channel coding and/or modulation settings may be altered so as to improve the transmission capabilities of the system.

An optimal modulation mode may be selected from the group comprising: 16-quadrature-amplitude-modulation (16 QAM); 64-quadrature-amplitude-modulation (64 QAM); phase-shift-keying (PSK); amplitude-shift-keying (ASK); amplitude modulation (AM); frequency modulation (FM) and other modulation modes common in the art.

In an embodiment of the present invention, an interleave length may be optimized so as to account for a given link-loss. To improve the error correction capabilities of the system, additional control bits may be incorporated. However, this increase in interleave length also induces greater delay in signal decoding. As such, it is desirable for a system to operate in such a state only when topographic impediments render it necessary for maintaining accurate transmissions.

In a further embodiment of the present invention, an interleave type may be optimized so as to account for a given link-loss. An optimal interleave type may be selected from the group comprising: block interleaving; diagonal interleaving; inter-block interleaving; convolution interleaving; and other interleave types common in the art. For example, use of diagonal interleaving for M input channels transceiving N-symbol data blocks results in an interleave/deinterleave delay of 3MN. However, the dispersion of burst errors is limited only to adjacent blocks implying that the probability of a burst error affecting a given block is only halved by the diagonal interleave scheme. As such, diagonal interleaving could be used by the inventive devices when the calculated link-loss is low and throughput should be maximized.

Alternatively, use of block interleaving for D input channels transceiving W-symbol blocks (where in W=N data symbols+P parity symbols) results in an interleave/deinterleave delay of 2WD−2W+2. However, the dispersion of burst errors is greater than that of diagonal interleaving as any burst error of length b (where b is less than D symbols) results in, at most, only one symbol error in a given data block. Furthermore, any burst error of length c (where c=rD symbols, r>1) results in no more than r symbol errors per data block. As such, block interleaving could be used by the inventive devices when the calculated link-loss is higher and throughput can be sacrificed for the sake of signal integrity.

In still a further embodiment of the present invention, a channel coding may be optimized to account for a given link-loss. An optimal channel coding may be selected from the group comprising: Turbo codes; Viterbi codes; parity checks; Hamming codes; Reed-Muller codes; Reed-Solomon codes, and other channel codings common in the art. A higher-order channel coding permits the transfer of more data bits per symbol and thus achieves higher throughputs. However, it must also be noted that when using a high-order channel coding scheme, better signal-to-noise ratios (SNRs) are required to overcome any interference and maintain a given bit-error-rate (BER). Adaptive channel coding allows the inventive devices to choose the highest-order channel coding mode which is effective for given channel conditions. As the range between two devices increases, the devices may step down to a lower-order channel coding scheme (e.g., Turbo Codes) having higher data transfer latency in exchange for the enhanced integrity of the transferred data. Conversely, as the range between two devices decreases, the devices may utilize a higher-order channel coding scheme (e.g., a simple parity check or Hamming code) resulting in increased throughput at the expense of some error correction capabilities.

In still a further embodiment of the present invention, a modulation mode may be optimized to account for a given link-loss. The optimal modulation mode may be selected from the group comprising: 16-quadrature-amplitude-modulation (16 QAM); 64-quadrature-amplitude-modulation (64 QAM); phase-shift-keying (PSK); amplitude-shift-keying (ASK); amplitude modulation (AM); frequency modulation (FM) and other modulation modes common in the art. Higher-order modulation modes permit the transfer of more data bits per symbol and thus achieve higher throughputs. However, it must also be noted that when using a high-order modulation technique (e.g., 64-QAM), better signal-to-noise ratios (SNRs) are required to overcome any interference and maintain a given bit error rate (BER). Adaptive modulation allows the inventive devices to choose the highest-order modulation mode which is effective for given channel conditions. As the range between two devices increases, the devices may step down to lower modulations (e.g., binary PSK) having higher data transfer latency in exchange for the enhanced integrity of the transferred data. Conversely, as the range between two devices decreases, the devices may utilize higher order modulations (e.g., QAM) for increased throughput at the expense of some error correction capabilities.

Once each mobile communications device 110 has determined its optimal interleave length and/or interleave type and/or channel coding and/or modulation mode, it may communicate this value with the remaining mobile communications devices via the low-power return channel 140. Following the exchange of the optimal settings for each mobile communications device 110, mutual settings are negotiated between the collective devices. The mutually negotiated settings are such that the link-loss from any one device to any other device is above a prescribed threshold level. This negotiation may occur via any number of ad-hoc routing schemes common in the art. Such schemes may include pro-active routing, flooding, reactive routing, or dynamic cluster-based routing.

Additionally, in other embodiments, a mobile communications device 110 may further comprise a fixed-position communication device database 115. The fixed-position communication device database comprises the positions of all known fixed-position communications devices of interest in a given area. As a result, the processing device 113 may directly access this position data via data bus 119 thereby calculating inter-device LoS distances and the resulting link-loss more efficiently as the mobile devices are not required to wait for GPS location information from the fixed position communications devices prior to calculating the associated link-loss. For example, a land mobile radio system may include a fixed-position base station responsible for the dispatch and group coordination of multiple mobile field units. The forward data communications link between the base and the mobile units could be optimized very efficiently with the prior knowledge of the fixed position.

Figure 3:
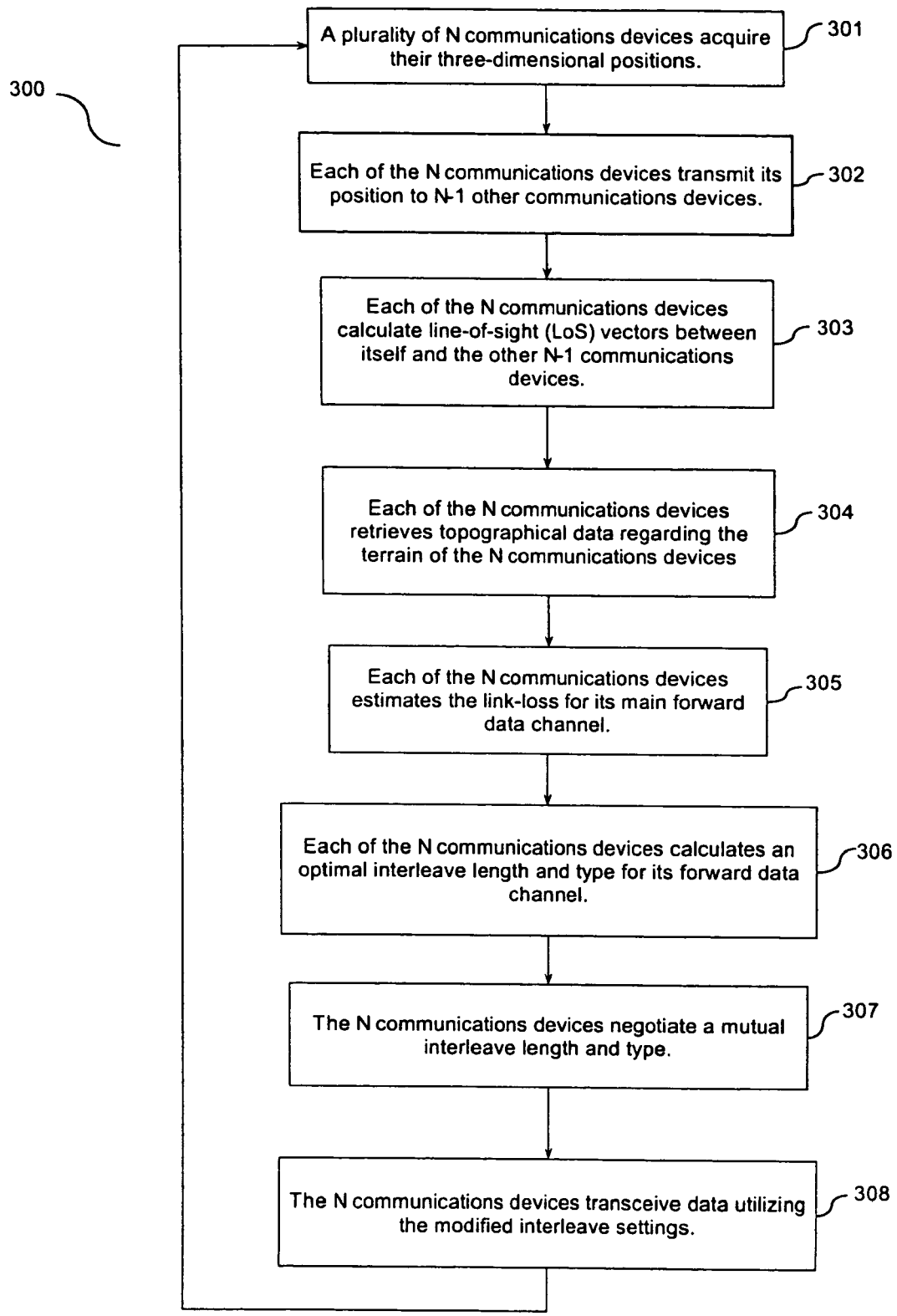
FIG. 3 depicts a flowchart detailing a methodology for communicating between two or more mobile communications devices in an embodiment of the present invention.

Referring to FIG. 3, a process flow chart detailing a system 300 for communicating between N communications devices 110 in accordance with an embodiment of the present invention is disclosed. Each of the N communications devices can acquire its three-dimensional position using a GPS system at state 301. Each of these positions is transmitted to the remaining N−1 communications devices via a low-power return channel at state 302. The transmission of the three-dimensional position at state 302 may occur by a direct broadcast or by any number of ad-hoc routing schemes common in the art. Such schemes may include pro-active routing, flooding, reactive routing, or dynamic cluster-based routing.

Each of the N communications devices uses its position and the position of the remaining N−1 communications devices to calculate three-dimensional line-of-sight (LoS) vectors between itself and the remaining N−1 communications devices at state 303.

Each of the N communications devices 110 then retrieves topographical data regarding the terrain characteristics of its geographic position and the geographic positions of the N−1 communications devices from its own embedded geographic information system (GIS) at state 304. Using the calculated LoS vectors and the terrain characteristics of the various positions of the N communications devices, each of the N communications devices estimates the link-loss for its high-power forward data channel along each respective LoS at state 305.

Once a link-loss has been calculated, each of the N communications devices selects an optimal interleave length and type for its forward data channel so as to best compensate for the link-loss at state 306. The N communications devices then negotiate a mutual interleave length and type via the low-power return channel at state 307. Once a mutual setting is agreed upon, the N communications devices each modify their interleave settings for their high-power forward channel to correspond with the mutual setting. Once all communications devices have reached the same optimal interleave settings, they are able to transceive data via the high-power forward data channel using the optimal channel conditions as dictated by the positions and terrain of the N communications devices at state 308.

Figure 4:
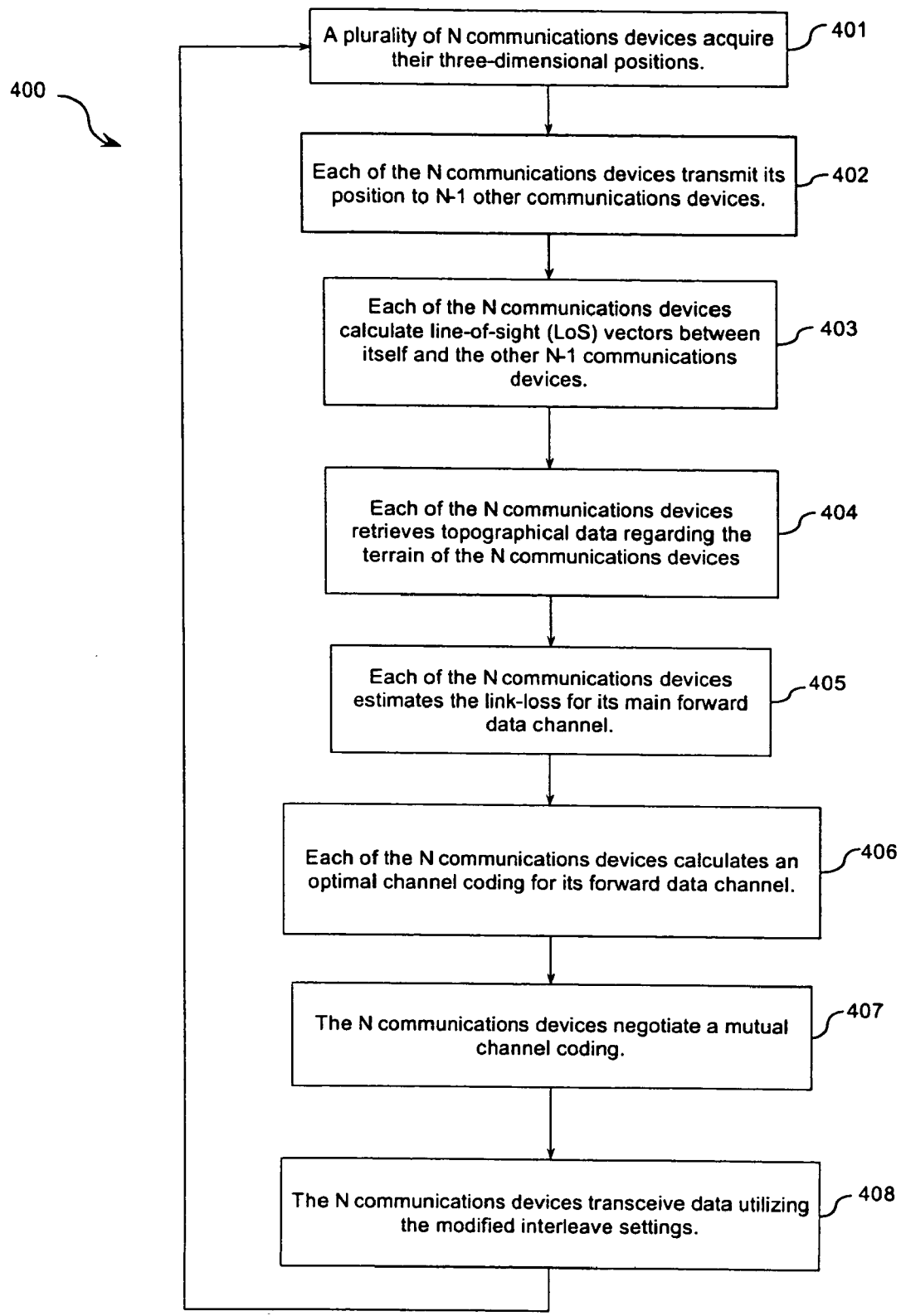
FIG. 4 depicts a flowchart detailing a methodology for communicating between two or more mobile communications devices in an embodiment of the present invention.

Referring to FIG. 4, a process flow chart detailing a system 400 for communicating between N communications devices 110 in accordance with an embodiment of the present invention is disclosed. Each of the N communications devices can acquire its three-dimensional position using a GPS system at state 401. Each of these positions is transmitted to the remaining N−1 communications devices via a low-power return channel at state 402. The transmission of the three-dimensional position at state 402 may occur by a direct broadcast or by any number of ad-hoc routing schemes common in the art. Such schemes may include pro-active routing, flooding, reactive routing, or dynamic cluster-based routing.

Each of the N communications devices uses its position and the position of the remaining N−1 communications devices to calculate three-dimensional line-of-sight (LoS) vectors between itself and the remaining N−1 communications devices at state 403.

Each of the N communications devices 110 then retrieves topographical data regarding the terrain characteristics of its geographic position and the geographic positions of the N−1 communications devices from its own embedded geographic information system (GIS) at state 404. Using the calculated LoS vectors and the terrain characteristics of the various positions of the N communications devices, each of the N communications devices estimates the link-loss for its high-power forward data channel along each respective LoS at state 405.

Once a link-loss has been calculated, each of the N communications devices selects an optimal channel coding method for its forward data channel so as to best compensate for the link-loss at state 406. The N communications devices then negotiate a mutual channel coding method via the low-power return channel at state 407. Once a mutual setting is agreed upon, the N communications devices each modify their channel coding settings for their high-power forward channel to correspond with the mutual setting. Once all communications devices have reached the same optimal channel coding settings, they are able to transceive data via the high-power forward data channel using the optimal channel conditions as dictated by the positions and terrain of the N communications devices at state 408.

Figure 5:
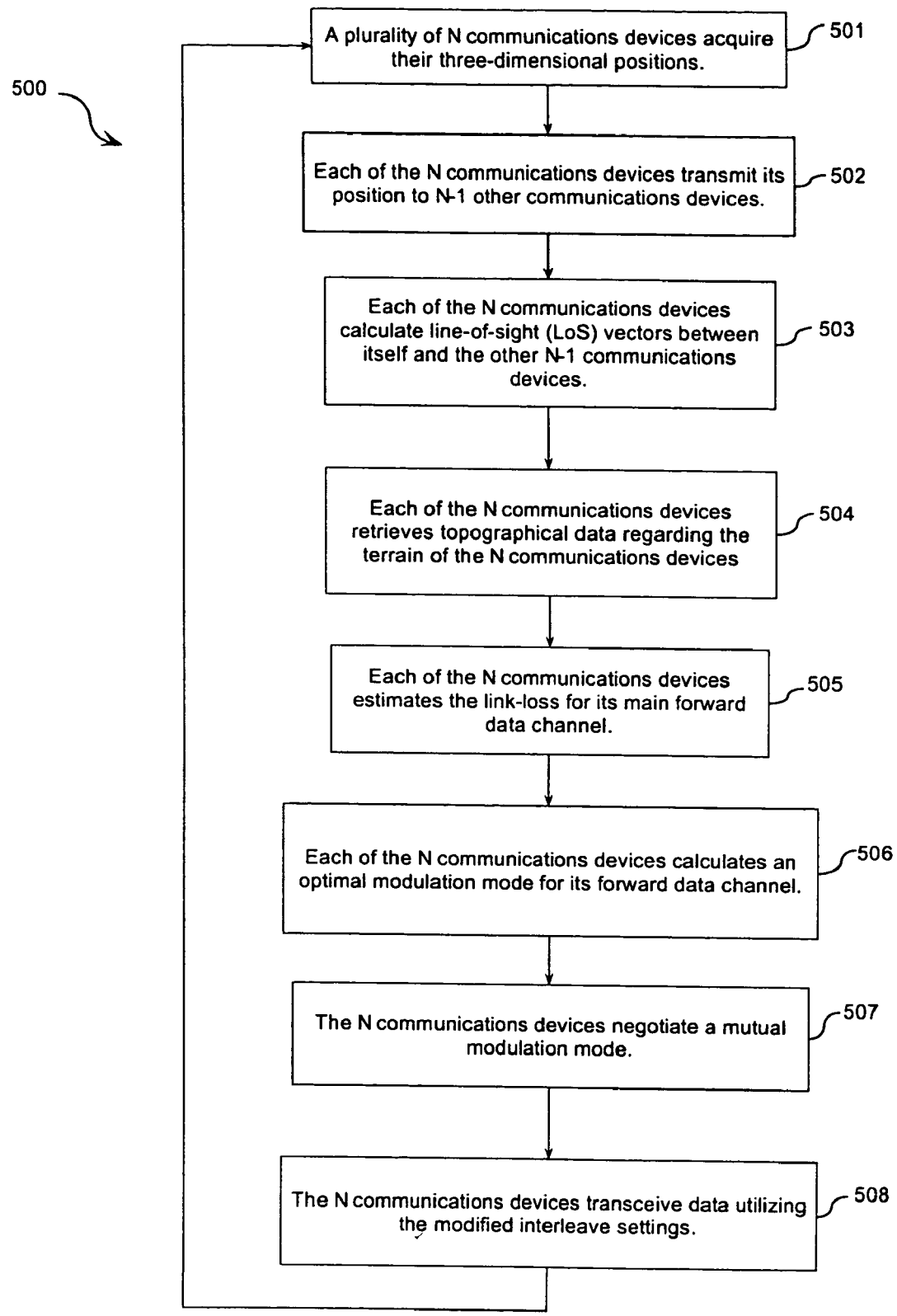
FIG. 5 depicts a flowchart detailing a methodology for communicating between two or more mobile communications devices in an embodiment of the present invention.

Referring to FIG. 5, a process flow chart detailing a system 500 for communicating between N communications devices 110 in accordance with an embodiment of the present invention is disclosed. Each of the N communications devices can acquire its three-dimensional position using a GPS system at state 501.

Each of these positions is transmitted to the remaining N−1 communications devices via a low-power return channel at state 502. The transmission of the three-dimensional position at state 502 may occur by a direct broadcast or by any number of ad-hoc routing schemes common in the art. Such schemes may include pro-active routing, flooding, reactive routing, or dynamic cluster-based routing.

Each of the N communications devices uses its position and the position of the remaining N−1 communications devices to calculate three-dimensional line-of-sight (LoS) vectors between itself and the remaining N−1 communications devices at state 503.

Each of the N communications devices 110 then retrieves topographical data regarding the terrain characteristics of its geographic position and the geographic positions of the N−1 communications devices from its own embedded geographic information system (GIS) at state 504. Using the calculated LoS vectors and the terrain characteristics of the various positions of the N communications devices, each of the N communications devices estimates the link-loss for its high-power forward data channel along each respective LoS at state 505.

Once a link-loss has been calculated, each of the N communications devices selects an optimal modulation mode for its forward data channel so as to best compensate for the link-loss at state 506. The N communications devices then negotiate a mutual modulation mode via the low-power return channel at state 507. Once a mutual setting is agreed upon, the N communications devices each modify their modulation settings for their high-power forward channel to correspond with the mutual setting. Once all communications devices have reached the same optimal modulation settings, they are able to transceive data via the high-power forward data channel using the optimal channel conditions as dictated by the positions and terrain of the N communications devices at state 508.

In still a further embodiment, the present invention may be implemented as component of a cognitive radio (CR) system. CR is a paradigm for wireless communication in which either a network or an individual wireless node changes particular transmission or reception parameters in order to execute its tasks more efficiently and without interfering with the other system users. A CR is a software defined radio with a "cognitive engine" brain. Conceptually, the cognitive engine responds to the operator's commands by configuring the radio for whatever combinations of waveform, protocol, operating frequency, and networking are required. A CR monitors its own performance continuously, reading the radio's outputs to determine the RF environment, channel conditions, link performance, etc., and adjusting the radio's transceiving parameters to deliver the needed quality of service subject to an appropriate combination of user requirements, operational limitations, and regulatory constraints. These parameters may comprise one or more of the following: interleave length, interleave type, modulation mode, channel coding, antenna gain, antenna direction and power levels.

In still a further embodiment, the present invention may be implemented as a component of a software-defined radio system. A software-defined radio performs significant amounts of signal processing in a general purpose computer, or a reconfigurable piece of digital electronics. The goal of this design is to produce a radio that can receive and transmit a new form of radio protocol just by running new software.

It is believed that the present invention and many of its attendant advantages will be understood from the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A communications device comprising:
   a global positioning system (GPS) receiver capable of receiving position data;
   a radio frequency (RF) transceiver having at least a first channel and a second channel;
   a geographical information system (GIS) database of topographical data;
   a processor configured to:
   calculate a line-of-sight obtained from the GPS position data of the communications device and position data of a second communications device;
   calculate a link-loss for the first channel based on the line-of-sight and the topographical data of the GIS database, and
   optimize a channel coding for the first channel based on the link-loss for the first channel; and
   a bus linking the GPS receiver, RF transceiver, GIS database, and processor.

2. The communications device of claim 1, further comprising:
   a database having position data of fixed-position communications devices including the second communications device,
   wherein the bus links the fixed-position communications device database and the processor.

3. The communications device of claim 1,
   wherein the channel coding type is selected from the group comprising:
   Turbo codes;
   Viterbi codes;
   parity checks;
   Hamming codes;
   Reed-Muller codes; and
   Reed-Solomon codes.

4. The communications device of claim 1
   wherein the RF transceiver transmits the positioning data of the communications device via the second channel and receives positioning data regarding the second communications device via the second channel.

5. The communications device of claim 1,
   wherein the GIS database maintains information including at least one of:
   terrain elevations;
   locations of permanent natural and man-made objects; and
   physical compositions of the natural and man-made objects.

6. A method for data communications comprising the steps of:
   transmitting global positioning system (GPS) position data of a first communications device;
   receiving GPS position data of a second communications device;
   accessing a geographic information system (GIS) database having topographical data;
   calculating a line-of-sight based on the GPS position data of the first communications device and the received GPS position data of the second communications device;
   calculating a link-loss value for a first transceiving channel based on the line-of-sight and the topographical data;
   optimizing a channel coding for the first transceiving channel based on the link-loss value; and
   transceiving communications data via the first transceiving channel.

7. The method of claim 6, further comprising the step of:
   negotiating a mutual channel coding between the first communications device and the second communications device.

8. The method of claim 7, wherein the negotiation occurs via a second transceiving channel.

9. The method of claim 6, wherein the transmission of the GPS position data of the first communications device and reception of the GPS position data of the second communications device is via a second transceiving channel.

10. A machine readable medium comprising machine executable instructions for executing a process, the process comprising:
    transmitting GPS position data from a first communications device;
    receiving GPS position data from a second communications device;
    accessing a GIS database to obtain topographical data;
    calculating a line-of-sight based on the GPS position data of the first communications device and the received GPS position data of the second communications device;
    calculating a link-loss value for a first transceiving channel based on the line-of-sight and the topographical data;
    optimizing an channel coding for the first transceiving channel based on the link-loss value; and
    transceiving communications data via the first transceiving channel.

11. The machine readable medium of claim 10, further comprising:
    negotiating a mutual channel coding between the first communications device and the second communications device.

12. The machine readable medium of claim 11,
    wherein the negotiation occurs via a second transceiving channel.

* * * * *